(12) United States Patent
Lubben

(10) Patent No.: US 9,457,624 B2
(45) Date of Patent: Oct. 4, 2016

(54) VARIABLE TREAD AXLE ASSEMBLY FOR TIRE INFLATION SYSTEM

(71) Applicant: Deere & Company, Moline, IL (US)

(72) Inventor: Jeffrey Loren Lubben, Hudson, IA (US)

(73) Assignee: DEERE & COMPANY, Moline, IL (US)

( * ) Notice: Subject to any disclaimer, the term of this patent is extended or adjusted under 35 U.S.C. 154(b) by 78 days.

(21) Appl. No.: 14/521,111

(22) Filed: Oct. 22, 2014

(65) Prior Publication Data

US 2016/0114634 A1 Apr. 28, 2016

(51) Int. Cl.
*B60C 23/14* (2006.01)
*B60C 23/00* (2006.01)

(52) U.S. Cl.
CPC .................................. *B60C 23/003* (2013.01)

(58) Field of Classification Search
CPC ........................................................ B60C 23/003
USPC ................................................. 152/416, 417
See application file for complete search history.

(56) References Cited

U.S. PATENT DOCUMENTS

| | | | |
|---|---|---|---|
| 1,794,900 A * | 3/1931 | Hutchinson ........... | B60C 23/003 152/417 |
| 4,287,931 A * | 9/1981 | Vogt ......................... | B05D 5/08 164/65 |
| 4,387,931 A | 6/1983 | Bland | |
| 4,434,833 A * | 3/1984 | Swanson ............... | B60C 23/003 141/38 |
| 4,498,515 A * | 2/1985 | Holtzhauser .......... | B60C 23/003 137/224 |
| 4,641,698 A * | 2/1987 | Bitonti .................. | B60C 23/003 137/223 |
| 4,700,763 A * | 10/1987 | Williams .............. | B60C 23/003 137/522 |
| 4,705,090 A * | 11/1987 | Bartos ................... | B60C 23/003 137/224 |
| 4,765,385 A * | 8/1988 | McGeachy ........... | B60C 23/003 137/116.3 |
| 5,253,688 A | 10/1993 | Tigges | |

(Continued)

FOREIGN PATENT DOCUMENTS

| | | |
|---|---|---|
| DE | 102010054366 A1 | 6/2012 |
| WO | 2013056988 A1 | 4/2013 |

OTHER PUBLICATIONS

Fendt, "Variogrip", image from web site http://www.fendt.com/int/7699,asp, 2014, published by Fendt.

(Continued)

*Primary Examiner* — Jeffrey J Restifo

(57) ABSTRACT

An axle assembly is provided for a tire inflation system and supports a wheel which is movably mountable on the axle. The axle assembly includes an axle housing, an axle rotatably supported by the axle housing and an end plate sealingly engaging an end of the axle. A supply passage and a pilot conduit extend axially along a central axis of the axle, and communicate supply and pilot inlets to supply and pilot outlets in the end plate. Flexible supply and pilot hoses are coiled around an outer surface of the axle and connect the outlets to an inflation control valve mounted to a hub of the wheel. The supply passage and pilot conduit are coaxial and the pilot conduit extends through the supply passage.

27 Claims, 3 Drawing Sheets

(56) References Cited

U.S. PATENT DOCUMENTS

| | | | | |
|---|---|---|---|---|
| 5,429,167 A * | 7/1995 | Jensen | B60C 23/003 | 152/415 |
| 6,105,645 A * | 8/2000 | Ingram | B60C 23/003 | 152/415 |
| 6,145,559 A * | 11/2000 | Ingram, II | B60C 23/003 | 152/417 |
| 6,244,316 B1 * | 6/2001 | Naedler | B60C 23/003 | 152/417 |
| 6,435,238 B1 * | 8/2002 | Hennig | B60C 23/003 | 152/415 |
| 7,185,688 B2 * | 3/2007 | Hayes | B60C 23/003 | 152/415 |
| 7,207,365 B2 * | 4/2007 | Nelson | B60C 23/003 | 152/415 |
| 7,690,412 B1 * | 4/2010 | Jenkinson | B60C 23/003 | 152/416 |
| 8,052,400 B2 * | 11/2011 | Isono | B60C 23/003 | 152/417 |
| 2009/0084481 A1 * | 4/2009 | Kalavitz | B60C 23/003 | 152/417 |
| 2015/0059919 A1 * | 3/2015 | Stadele | B60C 23/003 | 141/4 |
| 2015/0059946 A1 * | 3/2015 | Keeney | B60C 23/003 | 152/417 |
| 2015/0075688 A1 * | 3/2015 | Keeney | B60C 23/003 | 152/417 |

OTHER PUBLICATIONS

European Search Report in foreign counterpart application No. 15187539.0 dated Mar. 18, 2016 (7 pages).

* cited by examiner

US 9,457,624 B2

VARIABLE TREAD AXLE ASSEMBLY FOR TIRE INFLATION SYSTEM

FIELD

The present disclosure relates to an axle assembly for use in vehicle tire inflation system.

BACKGROUND

Central tire inflation systems have been designed to adjust tire inflation so that tires will have better performance during different situations, such as during transport duty and during operation in the field. For example, to reduce undesirable compacting of the ground, systems for regulating tire pressure can reduce tire pressure during field operation in contrast to the higher pressure used during on-road operation. Certain vehicles, such as agricultural tractors, have rack and pinion "bar" type axles so that the wheels and tires can be placed at different positions on the axle. This allows the tread width of the vehicle to adapted to different situations. It is desired to provide an axle design which works with a tire inflation system on a vehicle which has an adjustable tread width. U.S. Pat. No. 6,435,238, issued in 200 shows a stationary axle with air conduits and ABS cables routed through the interior of the non-rotating axle. Other US patents, including U.S. Pat. No. 1,794,900, No. 4,387,931 No. 6,435,238 and No. 6,145,559 show designs where tire pressure passages pass through a vehicle axle. However, none of these design provide for both a supply pressure and a pilot pressure for a tire inflation control valve. And, none of these designs can accommodate a wheel and tire which can be placed at different positions on the axle.

SUMMARY

According to an aspect of the present disclosure, an axle assembly is provided for a tire inflation system having a pressure source and a tire pressure control valve for controlling tire pressure as a function of a pilot pressure. The axle assembly supports a wheel which is mountable at a plurality of positions on the axle. The axle assembly includes an axle housing, an axle rotatably supported by the axle housing and an end plate. A supply passage extends axially along a central axis of the axle from a first passage end to a second passage end. A pilot conduit extends through the supply passage from a first conduit end to a second conduit end. A supply inlet communicates the pressure source with the first end of the supply passage. A supply outlet communicates the second end of the passage with the control valve. A pilot inlet communicates a source of pilot pressure with the first end of the conduit. A pilot outlet communicates the second end of the conduit with the control valve.

The end plate sealingly engages an outer end of the axle. A plate supply bore extends radially through the end plate and communicates the supply passage to the supply outlet. A plate pilot bore extends radially through the end plate and communicates the pilot conduit to the pilot outlet.

A flexible supply hose is connected to the supply outlet, and a flexible pilot hose connected to the pilot outlet. The supply and pilot hoses are coiled around an outer surface of the axle.

The axle includes a larger diameter central axial bore and a smaller diameter pilot bore projecting axially from a first end of the central axial bore. The central axial bore terminates at a first end wall formed by the axle. The pilot conduit extends through said first end wall and an end of the first end of the pilot conduit is received by a portion of the pilot bore. The larger diameter central axial bore and the smaller diameter pilot bore have a common axis. The pilot bore has a stepped diameter which forms an annular shoulder which engages an end of the conduit. The axle housing surrounds a portion of the axle, surrounds an inner end of the supply passage and surrounds an inner end of the pilot conduit.

The passages in the axle and the hoses communicates air from an air pump to an inflation control manifold to a rotary seal to the axle shaft. The inflation and signal pressures are then routed through concentric passages to the end of the axle shaft where it passes from the manifold to coiled hoses which connect to a junction on the wheel. The line then continues to the valve stem and inflation valve. One passage provides the air flow to inflate the tires and the other is used to control the inflation valve at the wheel.

DETAILED DESCRIPTION OF THE DRAWINGS

Figure 1:
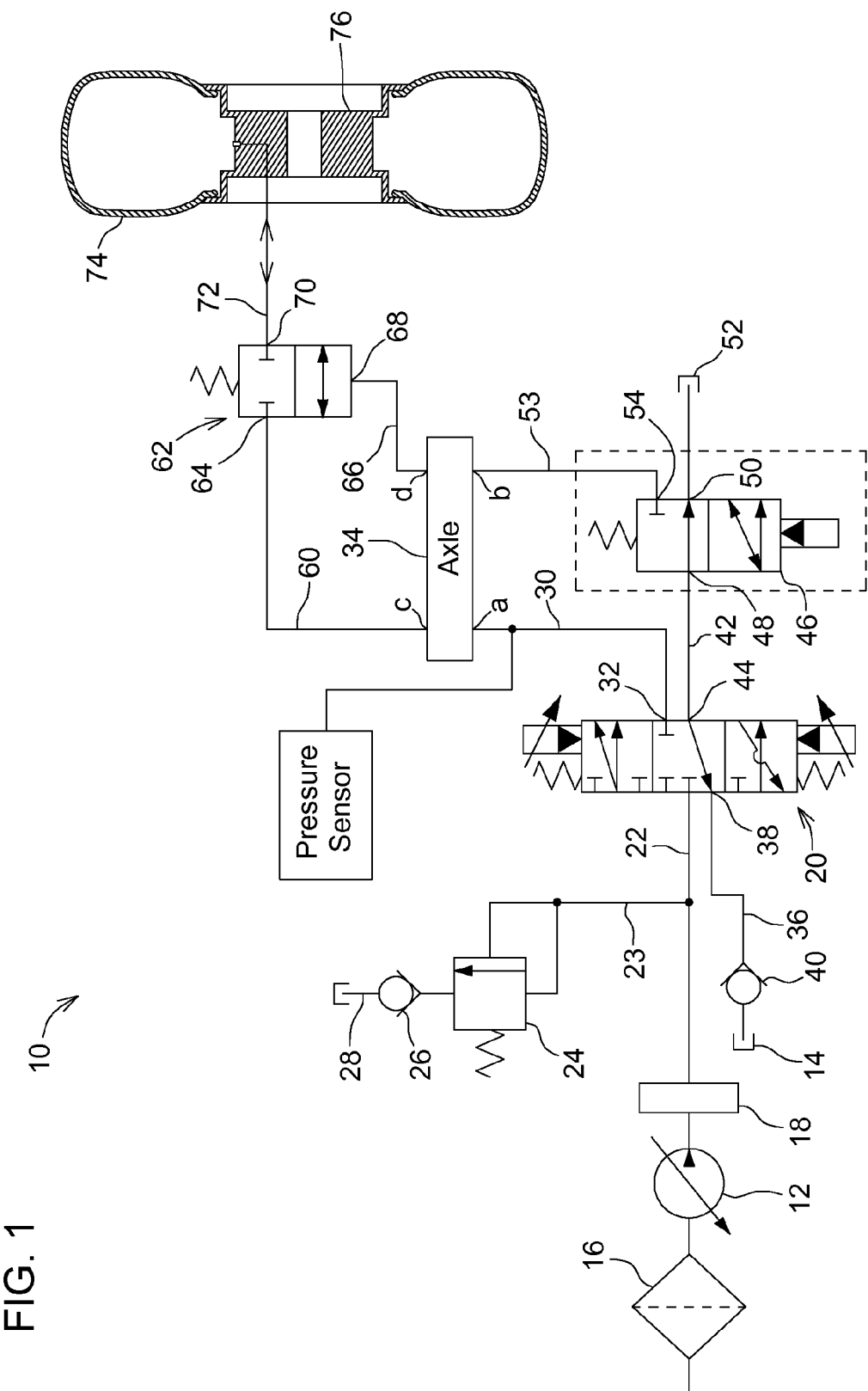
FIG. 1 is a schematic diagram of a tire inflation system embodying the invention.

Referring to FIG. 1, a tire inflation system 10 includes an air compressor 12 and an atmospheric vent 14. The compressor 12 draws air from a filter 16 and may push the air through a dryer 18 to an inlet of a solenoid operated inflation/deflation control valve 20. A line 22 between dryer 18 and valve 20 is connected to a vent 28 by line 23, a pressure relief valve 24 and a check valve 26. A supply line 30 communicates a supply outlet 32 of valve 20 to an axle assembly 34. Exhaust line 36 communicates port 38 of valve 20 through a check valve 40 to the vent 14. Line 42 communicates port 44 of valve 20 to port 48 of wheel pressure control valve 46. Port 50 of control valve 46 is communicated to a vent 52. Line 53 communicates port 54 of control valve 46 to the axle 34.

Line 60 communicates axle 34 to a supply port 64 of pilot operated wheel control valve 62. Line 66 communicates axle assembly 34 to a pilot port 68 of pilot operated wheel control valve 62. Line 72 communicates outlet 70 of control valve 62 to a tire 74 which is mounted on a wheel hub 76. The above description applies to a system for a single tire. The system could be applied to additional tires (not shown) by adding additional valves such as valves 46 and 62 for each tire.

Figure 2:
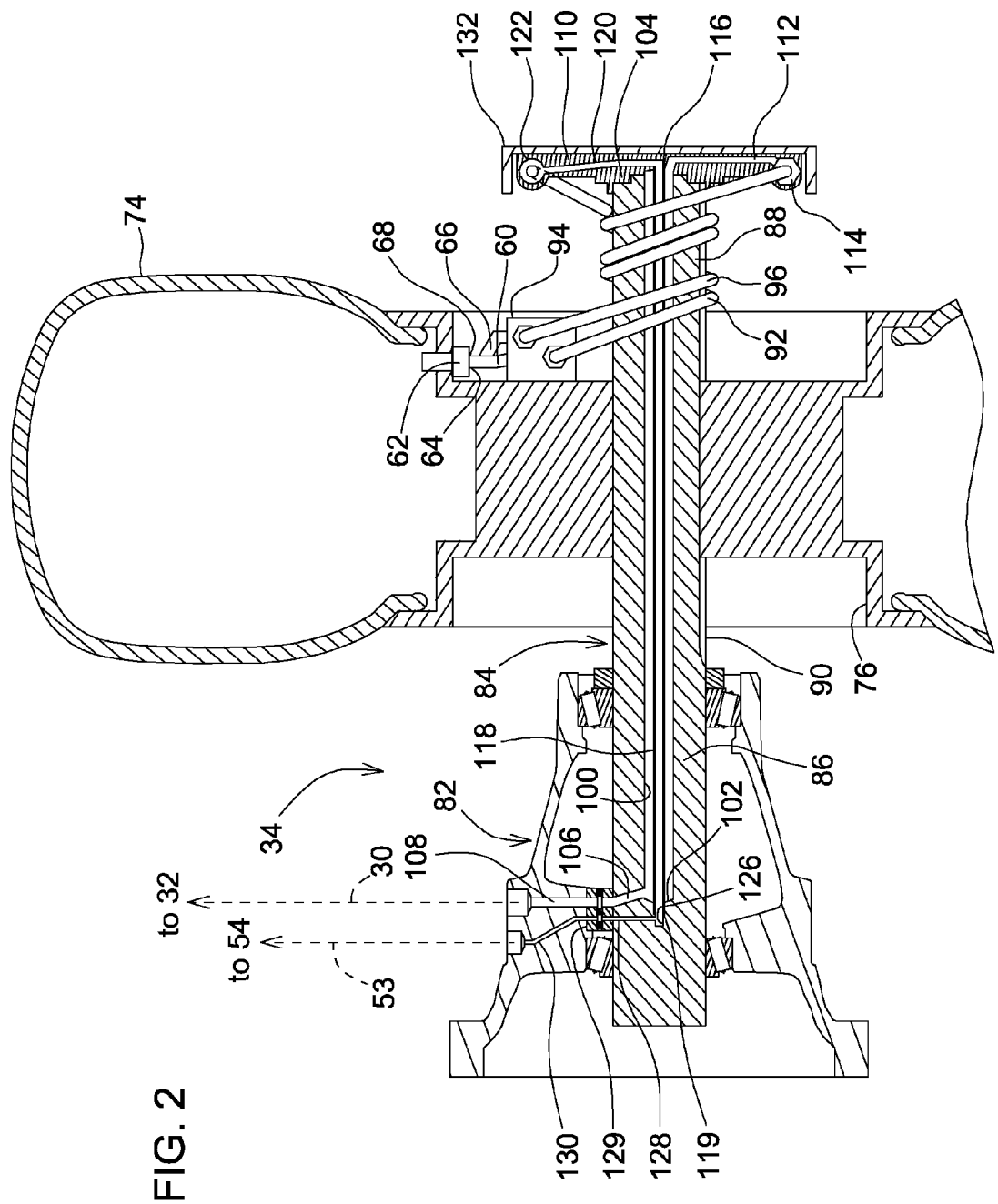
FIG. 2 is a sectional view of the axle assembly of FIG. 1.

Referring now to FIG. 2, the axle assembly 34 includes an axle housing 82 and an axle 84. An inboard end 86 of axle 84 is received by and rotatably supported by the axle housing 82. An outboard portion 88 of axle 84 supports the wheel hub 76 and includes a conventional rack 90 which is used to adjust the position of the wheel hub 76 in a known manner.

A central axial supply bore 100 is formed in the axle 84 and extends from an end wall 102 to the axially outer end 104 of the axle 84. A radial supply passage 106 extends though the axle 84 and communicates a first end of bore 100 to the exterior of the axle 84. A radial supply passage 108 extends through the axle housing 82 and communicates a passage 106 to the exterior of the axle housing 82 and with line 30.

An end plate 110 is sealingly attached to and covers the end 104 of the axle 84. A radial passage 112 extends through the end plate 110 and communicates the outer end of bore 100 with a supply outlet port 114 and with line 60. A central axial pilot bore 116 opens toward the axle 84 and extends part way into the plate 110. Pilot bore 116 receives and supports the outer end of pilot conduit 118. A radial passage 120 extends through the end plate 110 and communicates bore 116 with a pilot outlet 122 and with line 66. A flexible supply air hose 92 is coiled around the axle 84 and connects outlet port 114 with a manifold 94 and line 60. A flexible pilot air hose 96 is coiled around the axle 84 and connects outlet port 122 with manifold 94 and line 66. The hoses 92 and 96 are coiled around a portion of the axle 84 between the end plate 110 and the wheel hub 76. The hoses 92 and 96 flex to maintain a connection between lines 30, 53 and the valve 62 as the wheel hub 76 is moved axially to different positions on the axle 84.

Conduit 118 extends through the entire length of bore 100, is coaxial with bore 100, and has a smaller diameter than the diameter of bore 100. The larger diameter central axial bore 100 and the smaller diameter pilot bore 116 have a common axis. The axle housing 82 surrounds the inner portion 86 of the axle, surrounds an inner end of the supply passage or bore 100, and surrounds the first or inner end 119 of the pilot conduit 118. The bore 100 and the conduit 118 are both coaxial with a central rotation axis of the axle 84 and are symmetrical with respect to that axis.

A central axial pilot bore 126 extends into the axle 84 axially inwardly from end wall 102. Bore 126 is a blind bore, and has a diameter which is smaller than the diameter of supply bore 100. Pilot bore 126 receives and supports an inner end of pilot conduit 118, and communicates the interior of conduit 118 with a radial pilot passage 128. Bore 126 has a stepped diameter which forms an annular shoulder 127 which engages an end of the conduit 118.

Passage 128 extends radially through the axle 84 and communicates bore 126 with the outer surface of the axle 84. A radial supply passage 130 extends through the axle housing 82 and communicates passage 128 to the exterior of the axle housing 82 and to line 53. Seals 129 seal the supply and pilot passages from each other and from the environment. A circular cover plate 132 covers the end plate 110.

Figure 3:
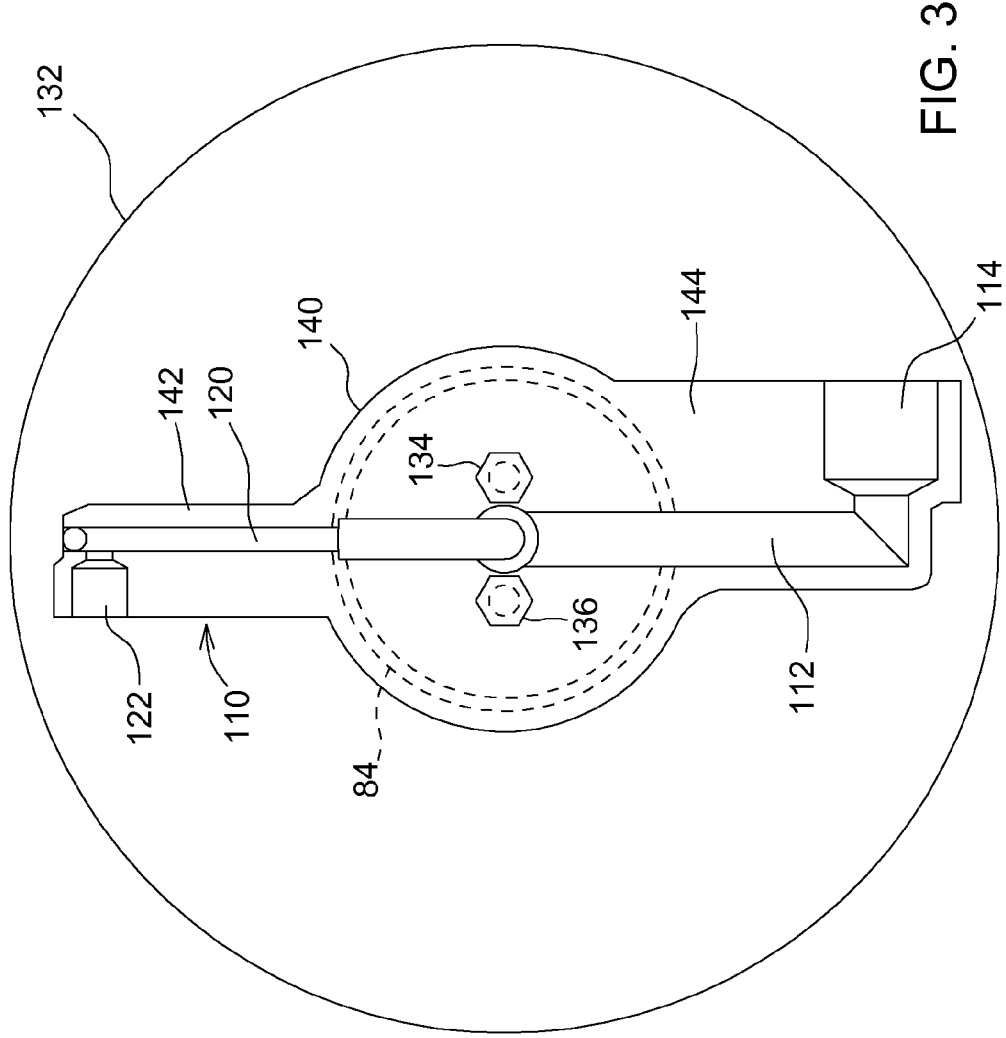
FIG. 3 is a view taken along lines 3-3 of FIG. 2.

As best seen in FIG. 3, the end plate 110 includes a central hub 140 and a pair of arms 142 and 144 which project radially outwardly from the hub 140 to clear the wheel hub 76. Bolts 134, 136 extend through cover plate 132 and through end plate 110 and are threadably received by threaded bores (not shown) in the end 104 of axle 84.

The result is an axle assembly which communicates a controlled supply of pressurized air to a wheel which can be placed at different positions on the axle. The air passages are routed through the axle shaft and protects the passages from external damage. The tread width can be changed without disturbing the tire inflation system. The supply passage has a larger diameter than the pilot conduit so that tires can be rapidly inflated or deflated.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. An axle assembly for a tire inflation system having a pressure source and a tire pressure control valve for controlling tire pressure as a function of a pilot pressure, the axle assembly supporting a wheel which is mountable at a plurality of positions on the axle, the axle assembly comprising:
    an axle housing;
    an axle rotatably supported by the axle housing;
    a supply passage extending axially along a central axis of the axle from a first passage end to a second passage end;
    a pilot conduit extending through the supply passage and extending from a first conduit end to a second conduit end;
    a supply inlet communicating the pressure source with the first end of the supply passage;
    a supply outlet communicating the second end of the passage with the control valve;
    a pilot inlet communicating a source of pilot pressure with the first end of the conduit;
    a pilot outlet communicating the second end of the conduit with the control valve;
    a flexible supply hose connected to the supply outlet; and
    a flexible pilot hose connected to the pilot outlet, the supply and pilot hoses being coiled around an outer surface of the axle.

2. The axle assembly of claim 1, wherein:
    the axle comprises a larger diameter central axial bore and a smaller diameter pilot bore projecting axially from a first end of the central axial bore, the central axial bore terminating at a first end wall formed by the axle; and
    the pilot conduit extends through said first end wall, and an end of the pilot conduit is received by a portion of the pilot bore.

3. The axle assembly of claim 2, wherein:
    the larger diameter central axial bore and the smaller diameter pilot bore have a common axis.

4. The axle assembly of claim 2, wherein:
    the pilot bore has a stepped diameter which forms an annular shoulder which engages an end of the conduit.

5. The axle assembly of claim 4, wherein:
    the supply passage extends away from the axle housing and towards an outboard end of the axle.

6. The axle assembly of claim 4, wherein:
    the axle housing surrounds a portion of the axle, surrounds an inner end of the supply passage and surrounds an inner end of the pilot conduit.

7. The axle assembly of claim 1, wherein:
    an end plate sealingly engages an outer end of the axle;
    a plate supply bore extends radially through the end plate and communicates the supply passage to the supply outlet; and
    a plate pilot bore extends radially through the end plate and communicates the pilot conduit to the pilot outlet.

8. The axle assembly of claim 1, wherein:
    the wheel is movable axially on the axle.

9. The axle assembly of claim 1, wherein:
    a first passage extends though the axle housing and communicates the pressure source with the supply inlet; and a second passage extends though the axle housing and communicates the pilot inlet with the source of pilot pressure.

10. An axle assembly for a tire inflation system having a pressure source and a tire pressure control valve for controlling tire pressure as a function of a pilot pressure, the axle assembly having an axle rotabably supported by an axle housing and the axle supporting a wheel which is mountable at a plurality of positions on the axle, the axle assembly comprising:
a supply passage extending axially in the axle;
a pilot passage extending through the axle;
a supply inlet in the axle and communicating the pressure source with the supply passage;
a supply outlet in the axle and communicating the passage with the control valve;
a pilot inlet in the axle and communicating a source of pilot pressure with the pilot passage;
a pilot outlet in the axle and communicating the pilot passage with the control valve;
a flexible supply hose connected between the supply outlet and the control valve; and
a flexible pilot hose connected between the pilot outlet and the control valve,
the supply hose and the pilot hose being coiled around a portion of the axle.

11. The axle assembly of claim 10, wherein:
the axle comprises a larger diameter central axial bore and a smaller diameter pilot bore projecting axially from a first end of the central axial bore, the central axial bore terminating at a first end wall formed by the axle; and
the pilot passage is formed by a smaller diameter pilot conduit which extends through the central axial bore, the pilot conduit extending through said first end wall and having a first conduit end which is received by a portion of the pilot bore.

12. The axle assembly of claim 10, wherein:
a portion of the supply passage is formed by a bore which extends axially through the axle; and
a portion of the pilot passage is formed by a conduit which extends axially through the axle.

13. The axle assembly of claim 12, wherein:
the conduit extends through the bore.

14. The axle assembly of claim 10, wherein:
the axle comprises a larger diameter central axial bore which extends axially outwardly from an end wall to an outer end of the axle; and
a smaller diameter blind pilot bore projects axially into the axle from the end wall, the pilot passage being formed by a pilot conduit which extends through the central axial bore, the pilot conduit having a first conduit end which is received by the pilot bore.

15. The axle assembly of claim 10, wherein:
the supply passage extends from a first passage end to a second passage end;
the pilot passage extends from a first pilot passage end to a second pilot passage end;
the supply inlet communicates the pressure source with the first end of the supply passage;
the supply outlet communicates the second end of the passage with the control valve;
the pilot inlet communicates the source of pilot pressure with the first end of the pilot passage; and
the pilot outlet communicates the second end of the pilot passage with the control valve.

16. The axle assembly of claim 10, wherein:
the supply passage and the pilot passage have a common axis.

17. The axle assembly of claim 10, wherein:
the wheel is movable axially on the axle.

18. The axle assembly of claim 10, wherein:
the supply passage and the pilot passage are both coaxial with a central rotation axis of the axle.

19. The axle assembly of claim 10, wherein:
the supply passage and the pilot passage are both symmetrical with respect to a central rotation axis of the axle.

20. An axle assembly for a tire inflation system for controlling pressure in a tire of a wheel which is mountable at a plurality of positions on an axle, the axle assembly comprising:
a first air passage extending axially in the axle;
a second air passage extending through the axle;
a first inlet in the axle communicating with the first air passage;
a first outlet in the axle communicating with the first air passage;
a second inlet in the axle communicating with the second air passage; and
a second outlet in the axle communicating with the second air passage a first flexible hose connected between the first outlet and a tire pressure control valve; and
a second flexible hose connected between the second outlet and the control valve, the first and second hoses being coiled around a portion of the axle.

21. The axle assembly of claim 20, wherein:
the wheel is movable axially on the axle.

22. The axle assembly of claim 20, wherein:
an end plate sealingly engages an outer end of the axle;
a first plate bore extends radially through the end plate and communicates with the first outlet; and
a second plate bore extends radially through the end plate and communicates with the second outlet.

23. An axle assembly for a tire inflation system for controlling tire pressure as a function of a pilot pressure, the axle assembly supporting a wheel with an inflatable tire, the axle assembly comprising:
an axle housing;
an axle rotatably supported by the axle housing;
a supply passage extending axially along a central axis of the axle;
a pilot conduit extending coaxially through the supply passage;
a flexible supply hose communicating the supply passage to the tire; and
a flexible pilot hose communicating the pilot conduit to the tire, the hoses being coiled around a portion of the axle.

24. The axle assembly of claim 23, wherein:
the hoses are connected to a tire pressure control valve.

25. The axle assembly of claim 23, wherein:
an end plate sealingly engages an outer end of the axle;
a first plate bore extends radially through the end plate and communicates with the supply passage; and
a second plate bore extends radially through the end plate and communicates with the pilot conduit.

26. The axle assembly of claim 25, wherein:
the supply hose is connected to the first plate bore; and
the pilot hose is connected to the second plate bore.

27. The axle assembly of claim 23, wherein:
the wheel is movable axially on the axle.

* * * * *